US010209931B2

(12) United States Patent
Watanabe et al.

(10) Patent No.: US 10,209,931 B2
(45) Date of Patent: Feb. 19, 2019

(54) IMAGE PROCESSING APPARATUS AND IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventors: Fumiyuki Watanabe, Tagata Shizuoka (JP); Makoto Hibino, Tagata Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/925,942

(22) Filed: Mar. 20, 2018

(65) Prior Publication Data

US 2019/0012120 A1 Jan. 10, 2019

(30) Foreign Application Priority Data

Jul. 6, 2017 (JP) .................................. 2017-132920

(51) Int. Cl.
*G06F 3/12* (2006.01)
*G06F 9/50* (2006.01)
*G06K 15/02* (2006.01)

(52) U.S. Cl.
CPC ............ *G06F 3/1213* (2013.01); *G06F 3/124* (2013.01); *G06F 3/1275* (2013.01); *G06F 3/1296* (2013.01); *G06F 9/5027* (2013.01); *G06K 15/1886* (2013.01); *G06F 2209/503* (2013.01)

(58) Field of Classification Search
CPC ...... G06F 3/1213; G06F 3/124; G06F 3/1275; G06F 3/1296; G06F 9/5027; G06F 2209/503; G06K 15/1886
USPC ......................................................... 358/1.15
See application file for complete search history.

(56) References Cited

U.S. PATENT DOCUMENTS

2010/0253972 A1* 10/2010 Ishikawa ................ G06K 15/02
358/1.15
2012/0212782 A1* 8/2012 Matsuda ............ G06K 15/1857
358/1.15
2017/0206442 A1* 7/2017 Takenaka ................ G06F 3/121
2018/0189981 A1* 7/2018 Singh ...................... G06T 9/002

FOREIGN PATENT DOCUMENTS

JP 2004-038527 A 2/2004
JP 2012-218227 A 11/2012

* cited by examiner

*Primary Examiner* — Allen H Nguyen
(74) *Attorney, Agent, or Firm* — Kim & Stewart LLP

(57) ABSTRACT

An image processing apparatus includes a first processor core configured to allocate a plurality of threads to execute a drawing processing for converting printing object data divided into a plurality of units of printing to printing data, a plurality of second processor cores designated to execute data compression on the printing data converted by the drawing processing, and a storage device in which the compressed printing data are stored. The first processor core allocates a new thread to execute the drawing processing upon determining that the number of the second processor cores in an idle state is greater than the number of threads that are executing the drawing processing by a predetermined number.

20 Claims, 8 Drawing Sheets

IMAGE PROCESSING APPARATUS AND IMAGE FORMING APPARATUS

CROSS-REFERENCE TO RELATED APPLICATION

This application is based upon and claims the benefit of priority from Japanese Patent Application No. 2017-132920, filed Jul. 6, 2017, the entire contents of which are incorporated herein by reference.

FIELD

Embodiments described herein relate generally to an image processing apparatus, an image processing method and a method

BACKGROUND

An image forming apparatus such as an MFP (multifunction peripheral) executes a RIP (Raster Image Processor) process for converting data described in a PDL (Page Description Language) such as PostScript or PDF (Portable Document Format) to raster data for printing in some cases. The RIP processing includes an analysis processing and a drawing processing. The analysis processing includes a process to divide data of a plurality of pages into intermediate data of a plurality of single pages. The drawing processing includes a process to convert the intermediate data from the analysis processing to the raster data for printing. The raster data for printing is hereinafter referred to as printing data.

The image forming apparatus stores the data converted with the RIP processing in a storage device such as a memory or a HDD (Hard Disk Drive). However, in a case in which data which is a printing object is a color image with high resolution, the data is a very large size. For this reason, the image is stored after compression processing. Since software-based compression takes much time to execute, hardware-based compression using a compression core may be used in some cases.

The image forming apparatus includes a processor having a plurality of cores, such as a multi-core CPU (Central Processing Unit) or a CPU with a GPU (Graphics Processing Unit) built therein. The processor operates as a RIP and executes the analysis processing and the drawing processing in parallel by multithreading or the like to improve a speed of the RIP processing. However, even if the RIP processing speed executed by the processor improves, a speed of the compression process by the compression core becomes a bottleneck. Even if the drawing processing is carried out in parallel, if the compression core is not idle, there is waiting time for compression processing. In this case, a speed of the entire process including the RIP processing and the compression processing may not be shortened, while the usage ratio of the processor increases. Since the processor of the image forming apparatus executes various processes other than the RIP processing, there is a case in which processing speed of other tasks becomes slower if the usage ratio by the RIP processing increases too much.

DETAILED DESCRIPTION

Figure 1:
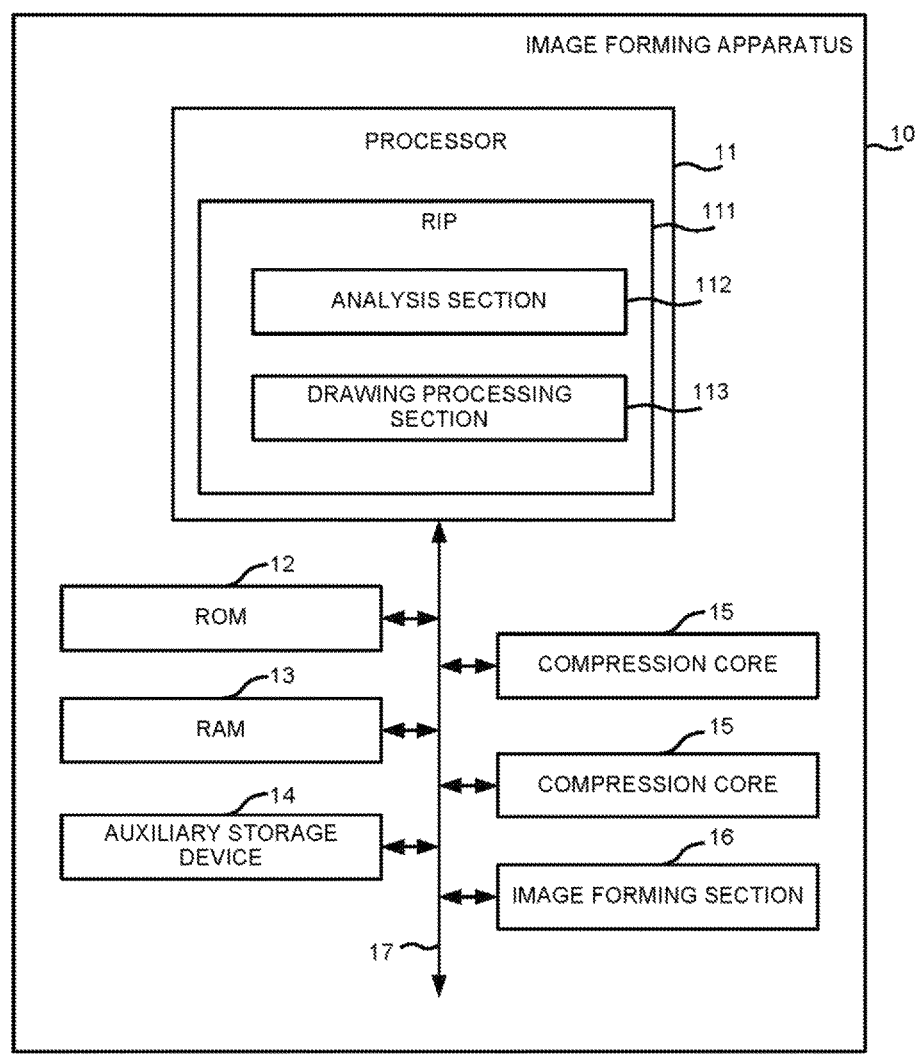
FIG. 1 is a block diagram illustrating an image forming apparatus according to an embodiment.

In accordance with an embodiment, an image processing apparatus includes a first processor core configured to allocate a plurality of threads to execute a drawing processing for converting printing object data divided into a plurality of units of printing to printing data, a plurality of second processor cores designated to execute data compression on the printing data converted by the drawing processing, and a storage device in which the compressed printing data are stored. The first processor core allocates a new thread to execute the drawing processing upon determining that the number of the second processor cores in an idle state is greater than the number of threads that are executing the drawing processing by a predetermined number.

Hereinafter, an image forming apparatus according to an embodiment is described with reference to the accompanying drawings.

FIG. 1 is a block diagram illustrating an image forming apparatus 10 according to the embodiment. The image forming apparatus 10 is, for example, an MFP or a copier having functions such as printing, scanning, copying, and facsimile. Alternatively, the image forming apparatus 10 is a printer having a printing function. The image forming apparatus 10 includes a processor 11, a ROM (Read-Only Memory) 12, a RAM (Random-Access Memory) 13, an auxiliary storage device 14, a compression core 15, an image forming section 16 and a bus 17. The image forming apparatus 10 is an example of an image processing apparatus.

The processor 11 acts as a central part of a computer which executes a calculation processing, a control processing and the like necessary for the operation of the image forming apparatus 10. The processor 11 controls each section to carry out various functions of the image forming apparatus 10 by executing programs such as system software, application software or firmware stored in the ROM 12 or the auxiliary storage device 14. The processor 11 is, for example, a CPU (Central Processing Unit), an MPU (Micro Processing Unit), a SoC (system on a Chip), a DSP (Digital Signal Processor) or a GPU (Graphics Processing Unit). Alternatively, the processor 11 may be a combination of these. The processor 11 is preferably a multi-core CPU, or a processor including a GPU and a CPU. The processor provided with a plurality of cores is capable of executing the processes at a high speed by executing concurrent processing such as by multithreading or a multiprocessing. The concurrent processing means simultaneously executing a plurality of threads or processes by switching them according to time division or the like, or executing a plurality of threads or processes in parallel. The parallel processing means simultaneously executing a plurality of threads or processes by a plurality of cores.

The ROM 12 is one component of a main storage device of a computer. The ROM 12 is a nonvolatile memory exclusively used for reading data. The ROM 12 stores the above programs. The ROM 12 stores data used by the processor 11 for executing various processes or various setting values.

The RAM 13 is another component of the main storage device of the computer. The RAM 13 is a memory used for reading and writing data. The RAM 13 is used as a work area for storing data used temporarily in execution of various processes by the processor 11.

The RAM 13 stores a variable p, a variable q and a variable r. The variable p indicates the number of threads in which the processor 11 executes a drawing processing. An initial value of the variable p is 0. The number of threads in which the processor 11 is executing the drawing processing is hereinafter referred to as a "drawing thread quantity". A variable q indicates the number of the compression cores 15 in an idle state. An initial value of the variable q is the number of the compression cores 15. The number of the compression cores 15 in the idle state is hereinafter referred to as an "idle core quantity". A variable r indicates the number of units of printing data in the compression wait queues (hereinafter, referred to as a compression wait quantity). An initial value of the variable r is 0. The compression wait queue contains a list of the printing data waiting for the compression processing. Therefore, the compression wait quantity indicates the number of the printing data waiting for the compression processing.

Further, the RAM 13 and the like store compression core information indicating whether the compression core 15 is in the idle state or a busy state. The compression core 15 in the idle state means it is not executing the compression process. The compression core 15 in the busy state is not idle because it is carrying out the compression processing. The compression core information stores a core ID (identifier), which is a unique identification number assigned to each compression core 15, and a parameter indicating whether the compression core 15 is in the idle state or in the busy state, in an associated manner.

The auxiliary storage device 14 acts as an auxiliary storage device of the computer. The auxiliary storage device 14 is, for example, an EEPROM (electric erasable programmable read-only memory), a HDD (hard disk drive), a SSD (solid state drive), or the like. The auxiliary storage device 14 stores the above programs in some cases. The auxiliary storage device 14 stores data used by the processor 11 for executing various processes, data generated by the processor 11, various setting values, and the like. The image forming apparatus 10 may have an interface for a storage medium such as a memory card or a USB (Universal Serial Bus) memory instead of the auxiliary storage device 14 or in addition to the auxiliary storage device 14.

The auxiliary storage device 14 also stores a setting value k. The setting value k can be any value set by, for example, a designer, an administrator or a service person of the image forming apparatus 10. For example, the value of the setting value k is set according to time required for an analysis processing, time required for the drawing processing, time required for a compression processing, a compression core quantity, a core quantity of the processor 11, and the like. The value of the setting value k is preferably a number greater than 0. This is because if the setting value k is 0, the compression core 15 is mostly in the idle state and the entire processing speed may become slow in some cases. Such a case can be avoided by setting the setting value k to be greater than 0. The value of the setting value k is more preferably 1. If the setting value k is too large, only a usage ratio of the processor 11 increases. The setting value k is further described below.

The programs stored in the ROM 12 or the auxiliary storage device 14 include a control program. As an example, the image forming apparatus 10 is generally delivered to the administrator of the image forming apparatus 10 in a state in which the control program has been stored in the ROM 12 or the auxiliary storage device 14. However, the image forming apparatus 10 may be delivered to the administrator in a state in which the control program has not been stored in the ROM 12 or the auxiliary storage device 14. The image forming apparatus 10 may be delivered to the administrator in a state in which another control program has been stored in the ROM 12 or the auxiliary storage device 14. The control program may be separately delivered to the administrator and written into the ROM 12 or the auxiliary storage device 14 under the operation of the administrator or a service person. At this time, the delivery of the control program may be achieved by recording the program in a removable storage medium such as a magnetic disk, a magneto-optical disk, an optical disk, a semiconductor memory or the like, or by downloading it via a network. The above control program includes a RIP program for the processor 11 to execute a RIP processing.

The ROM 12 or the auxiliary storage device 14 stores a job list which is a list of unprinted print jobs. A print job includes data such as an image or a document which is a printing object (hereinafter, referred to as printing object data).

The processor 11 operates as a RIP 111 by executing the RIP program.

The RIP 111 executes the RIP processing for converting the data described in a PDL format to the printing data. The RIP 111 includes an analysis section 112 and a drawing processing section 113.

The analysis section 112 executes the analysis processing including a process to divide the printing object data of a plurality of pages described in the PDL format into data of each page. The printing object data is converted to intermediate data by executing the analysis processing by the analysis section 112. The intermediate data is data on which the drawing processing shown below can be executed. The analysis processing is a sequential process. This is because it is difficult to execute the concurrent processing for the data described in the PDL format as a description order of elements and an order of appearance do not necessarily match and there are also elements that span a plurality of pages. One page is an example of one unit of printing.

The drawing processing section 113 executes the drawing processing for converting the intermediate data into the printing data. The printing data includes information indicating what kind of color is used for printing each print pixel. The intermediate data that one drawing processing section 113 converts with a single drawing processing is an example of one unit of printing.

The compression core 15 is, for example, a hardware accelerator which executes data compression on the printing data after the RIP processing is terminated. Although two compression cores 15 are shown in FIG. 1, the number of the compression cores 15 is not limited to two, and may be one, or three or more. Each compression core 15 stores the core ID assigned to itself. The compression core 15 is an example of a compression section.

The image forming section 16 performs printing by forming an image with ink or the like on a sheet-like image recording medium such as a paper. The image forming section 16 executes printing based on the printing data. For example, the image forming section 16 includes a laser printer, an inkjet printer or other printer.

The bus 17 includes a control bus, an address bus, a data bus, and the like, and carries signals transmitted and received by each section of the image forming apparatus 10.

Figure 2:
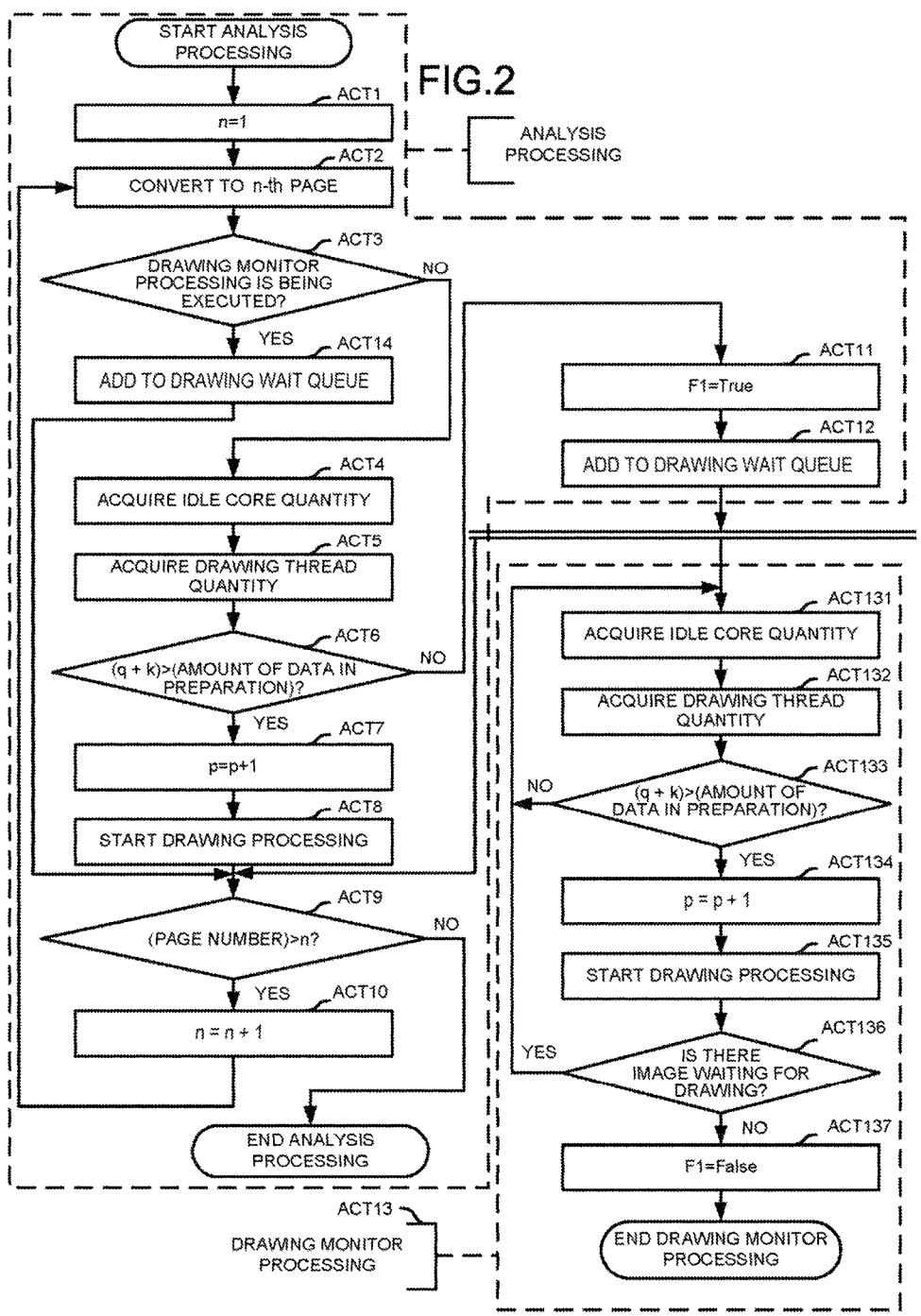
FIG. 2 is a flowchart illustrating a control processing by a processor in FIG. 1.
Figure 3:
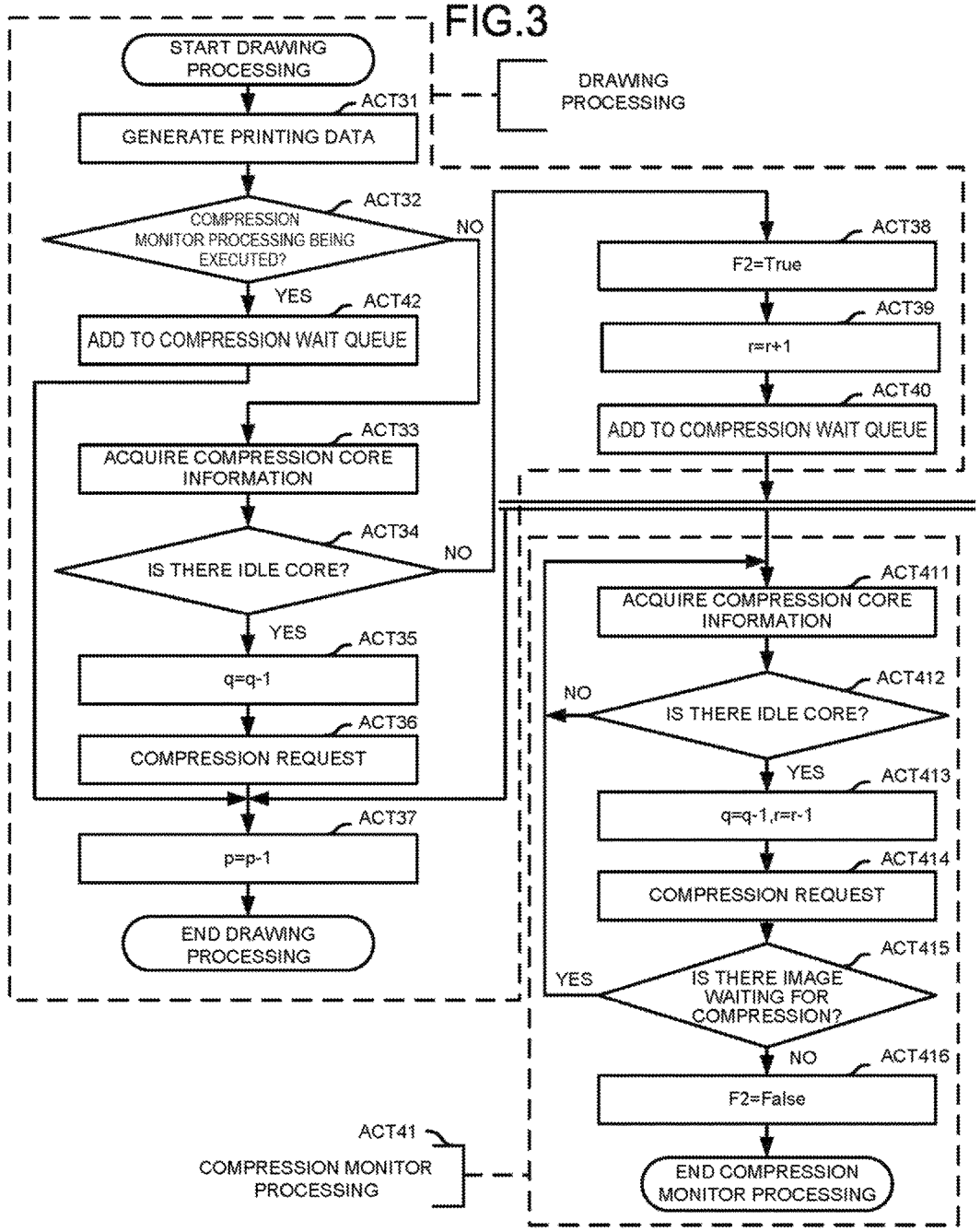
FIG. 3 is a flowchart illustrating the control processing by the processor in FIG. 1.

Hereinafter, the operation of the image forming apparatus 10 according to the embodiment is described with reference to FIG. 2 to FIG. 8. The contents of the processes in the following operation description are merely an example, and various processes capable of achieving the same result can be appropriately used. FIG. 2 and FIG. 3 are flowcharts of the control processing by the processor 11 of the image forming apparatus 10. The processor 11 executes the control processing based on the control program stored in the ROM 12 or the auxiliary storage device 14. The processor 11 operates as the RIP 111 by executing the control processing in FIG. 2 and FIG. 3. The processor 11 operates as the analysis section 112 by executing the control processing in FIG. 2. The processor 11 operates as the drawing processing section 113 by executing the control processing in FIG. 3. Alternatively, the processor 11 operates as the drawing processing section 113 by executing the drawing processing shown in FIG. 3. The processor 11 operates as a plurality of the drawing processing sections 113 by executing a plurality of the control processing in FIG. 3 or a plurality of the drawing processing shown in FIG. 3 in parallel. FIG. 5 is a flowchart of a hardware processing by the compression core 15 of the image forming apparatus 10. At the start of the control processing shown in FIG. 3, the processor 11 assigns the variable n and a variable F1 to the RAM 13. The variable n indicates which page of the printing object data is an object of the analysis processing. The variable F1 is a flag indicating that a drawing monitor processing is being executed. An initial value of the variable F1 is False. At the start of the control processing shown in FIG. 4, the processor 11 assigns a variable F2 to the RAM 13. The variable F2 is a flag indicating that a compression monitor processing is being executed. An initial value of the variable F2 is False.

Unless the description is made particularly, the processor 11 and the compression core 15 proceed to the processing to Act (n+1) after the processing in Act (n) (n is a natural number).

If there is the printing object data on which the RIP processing is not executed, the processor 11 starts the control processing shown in FIG. 2. For example, the printing object data is included in a print job. The control processing shown in FIG. 2 includes the analysis processing. The analysis processing includes the processing in Act 1 to Act 12 and Act 14.

In Act 1 in FIG. 2, the processor 11 of the image forming apparatus 10 sets the value of the variable n to 1.

In Act 2, the processor 11 converts the printing object data of a nth page into the intermediate data.

In Act 3, the processor 11 determines whether or not the drawing monitor processing is being executed. For example, the processor 11 determines whether or not the value of the variable F1 is True. If the drawing monitor processing is not being executed, the processor 11 determines No in Act 3 and proceeds to the processing in Act 4.

In Act 4, the processor 11 acquires the idle core quantity. In other words, the processor 11 acquires the value of the variable q from the RAM 13.

In Act 5, the processor 11 acquires the drawing thread number. The processor 11 acquires the value of the variable p from the RAM 13.

In Act 6, the processor 11 determines whether or not (the idle core quantity q+the setting value k)>(the amount of data in preparation) is satisfied. The amount of data in preparation is the amount of data being prepared for the compression processing. In other words, for example, (the amount of data in preparation)=(the drawing thread quantity p). If (the idle core quantity q+the setting value k)>(the amount of data in preparation) is satisfied, the processor 11 determines Yes in Act 6 and proceeds to the processing in Act 7.

In Act 7, the processor 11 increases the value of the variable p by 1 to indicate the start of the drawing processing.

In Act 8, the processor 11 starts the drawing processing on the intermediate data of the nth page. The processor 11 starts the control processing shown in FIG. 3. At this time, the processor 11 delivers the intermediate data of the nth page with respect to the control processing, for example. The processor 11 executes the control processing shown in FIG. 3 concurrently or in parallel with the control processing shown in FIG. 2 by executing the control processing in a separate thread from the control processing shown in FIG. 2. Preferably, the processor 11 executes both in parallel. If the processor 11 is also executing the drawing processing, by executing the control processing shown in FIG. 3 in a separate thread from the drawing processing which is already being executed, the processor 11 executes the control processing shown in FIG. 3 concurrently or in parallel with the drawing processing which is already being executed. Preferably, the processor 11 executes both in parallel. Thus, the processor 11 executes the drawing processing in the maximum (the number of the compression core 15+the setting value k) threads concurrently or in parallel in some cases. The processor 11 proceeds to the processing in Act 9 after the processing in Act 8 in FIG. 2.

In Act 9, the processor 11 determines whether or not the analysis processing is terminated for all pages of the printing object data. In other words, the processor 11 determines whether or not the number of pages of the printing object data is greater than n, for example. If the number of pages of the printing object data is greater than n, the processor 11 determines Yes in Act 9 and proceeds to the processing in Act 10.

In Act 10, the processor 11 increases the value of the variable n by 1 in order to change the object of the analysis processing to the next page. The processor 11 returns to the processing in Act 2 after the processing in Act 10. On the other hand, if the number of pages of the printing object data is not greater than n, the processor 11 determines No in Act 9 and terminates the analysis processing. Thus, the processor 11 repeats the processing in Act 2 to Act 10 until the value of n reaches the number of pages of the printing object data. Thus, the processor 11 executes the analysis processing on all the pages of the printing object data.

If (the idle core quantity+k)>(the amount of data in preparation) is not satisfied, the processor 11 determines No in Act 6 and proceeds to the processing in Act 11.

In Act 11, the processor 11 sets the value of the variable F1 from False to True to show that the drawing monitor processing is being executed.

In Act 12, the processor 11 adds the intermediate data of the nth page into the drawing wait queue. The drawing wait queue is a list of the intermediate data waiting for the drawing processing. The processor 11 starts a new thread after processing in Act 12. Then, the processor 11 proceeds to the processing in Act 9 in the existing thread. In addition, the processor 11 starts the drawing monitor processing shown in Act in the new thread. The processing in Act 13 includes processing in Act 131 to Act 137.

In Act 131, the processor 11 acquires the idle core quantity in the same manner as Act 4.

In Act 132, the processor 11 acquires the drawing thread quantity in the same manner as Act 5.

In Act 133, the processor 11 determines whether or not (the idle core quantity q+the setting value k)>(the amount of data in preparation) is satisfied as in Act 6. If (the idle core quantity q+the setting value k)>(the amount of data in preparation) is not satisfied, the processor 11 determines No in Act 133 and returns to the processing in Act 131. On the other hand, if (the idle core quantity q+the setting value k)>(the amount of data in preparation) is not satisfied, the processor 11 determines Yes in Act 133 and proceeds to the processing in Act 134.

In Act 134, the processor 11 increases the value of the variable p by 1 to show the start of the drawing processing.

In Act 135, the processor 11 selects the intermediate data added to the drawing wait queue first from the intermediate data included in the drawing wait queue. Then, similar to Act 8, the processor 11 starts the drawing processing on the intermediate data. Further, the processor 11 deletes the intermediate data from the drawing wait queue.

In Act 136, the processor 11 determines whether or not there is the intermediate data waiting for the drawing processing. In other words, the processor 11 determines whether or not there is the intermediate data in the drawing wait queue. If there is the intermediate data waiting for the drawing processing, the processor 11 determines Yes in Act 136 and returns to the processing in Act 131. On the other hand, if there is no intermediate data waiting for the drawing processing, the processor 11 determines No in Act 136 and proceeds to the processing in Act 137.

In Act 137, the processor 11 sets the value of the variable F1 to False to show that the drawing monitor processing is not being executed. The processor 11 terminates the drawing monitor processing after the processing in Act 137. Then, the processor 11 terminates the thread which is executing the drawing monitor processing.

If the drawing monitor processing is being executed during the processing in Act 3, the processor 11 determines Yes in Act 3 and proceeds to the processing in Act 14.

In Act 14, the processor 11 adds the intermediate data of the nth page into the drawing wait queue. The processor 11 proceeds to the processing in Act 9 after processing in Act 14.

Next, the control processing shown in FIG. 3 is described. The control processing shown in FIG. 3 includes the drawing processing. The drawing processing includes the processing in Act 31 to Act 40 and Act 42.

In Act 31 in FIG. 3, the processor 11 generates the printing data from the intermediate data which is the object. The intermediate data which is the object is, for example, delivered from the analysis processing or the drawing monitor processing.

In Act 32, the processor 11 determines whether or not the compression monitor processing is being executed. In other words, the processor 11 determines whether or not the value of the variable F2 is True, for example. If the compression monitor processing is not being executed, the processor 11 determines No in Act 32 and proceeds to the processing in Act 33.

In Act 33, the processor 11 acquires the compression core information from the RAM 13.

In Act 34, the processor 11 refers to the compression core information acquired in Act 33 to determine whether or not there is the compression core 15 in the idle state. Alternatively, the processor 11 may determine whether or not the value of the variable q is greater than 0. If there is the compression core 15 in the idle state, the processor 11 determines Yes in Act 34 and proceeds to the processing in Act 35.

In Act 35, the processor 11 reduces the value of the variable q by 1 to show that the number of the compression cores 15 in the idle state decreases.

In Act 36, the processor 11 transmits a compression request to the compression core 15 in the idle state to request the execution of the compression processing. The compression request includes the printing data converted in Act 31.

Figure 4:
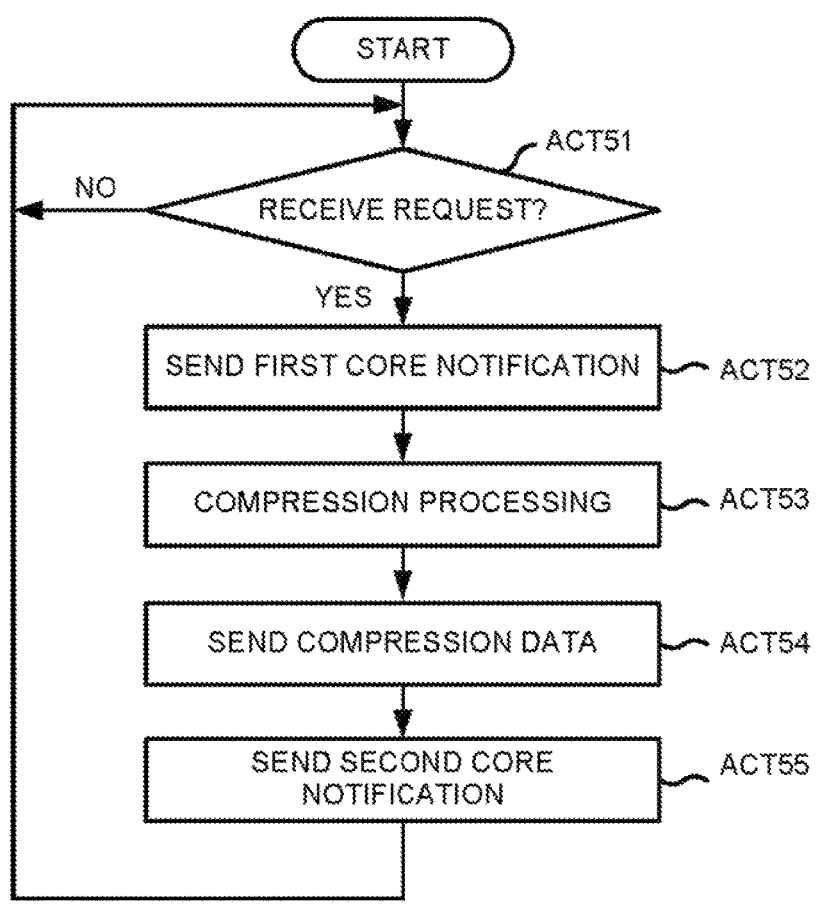
FIG. 4 is a flowchart illustrating a processing by a compression core in FIG. 1.
Figure 5:
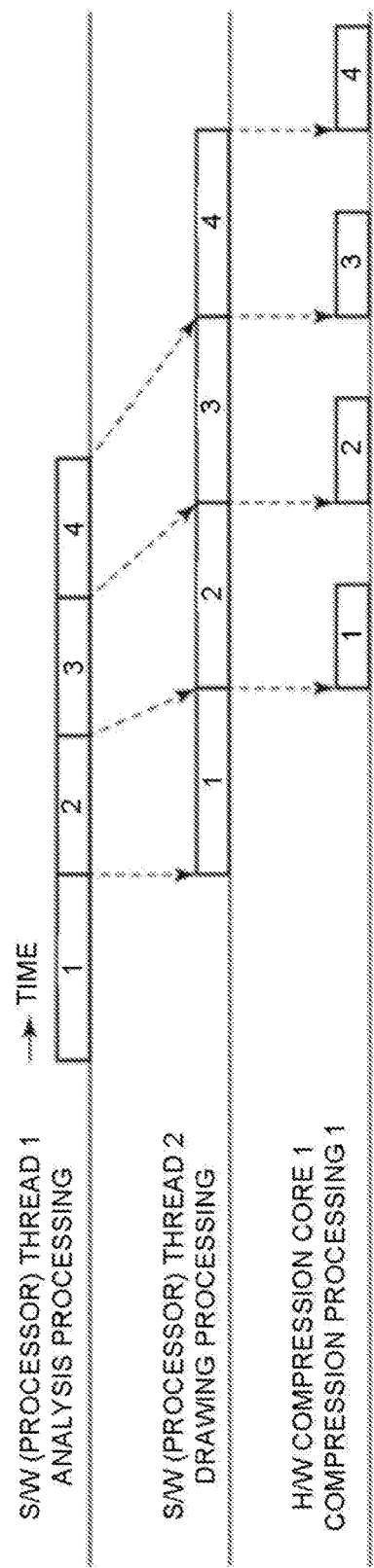
FIG. 5 is a diagram illustrating an example of processing timing of a conventional RIP process and compression process.

On the other hand, in Act 51 in FIG. 4, the compression core 15 waits for until the compression request is transmitted. Upon receiving the compression request, the compression core 15 determines Yes in Act 51 and proceeds to the processing in Act 52.

In Act 52, the compression core 15 sends a first core notification to the processor 11 to show that the compression core 15 becomes the busy state. The first core notification includes a core ID of the compression core 15 which is a transmission source of the first core notification. Upon receiving the first core notification, the processor 11 updates the compression core information and changes a parameter associated with the core ID included in the first core notification to indicate the busy state.

In Act 53, the compression core 15 executes data compression on the printing data included in the compression request received in Act 51. The data generated by the data compression is hereinafter referred to as "compression data".

In Act 54, the compression core 15 transmits the compression data generated in Act 53 to the auxiliary storage device 14. Upon receiving the compression data, the auxiliary storage device 14 stores the compression data.

In Act 55, the compression core 15 sends a second core notification to the processor 11 to show that the compression core 15 becomes in the idle state. The second core notification includes the core ID of the compression core 15 which is a transmission source of the second core notification. Upon receiving the second core notification, the processor 11 updates the compression core information and changes a parameter associated with the core ID included in the second core notification to indicate the idle state. The processor 11 increases the value of the variable q by 1 to show that the number of the compression cores 15 in the idle state is increased.

The processor 11 proceeds to the processing in Act 37 after processing in Act 36 in FIG. 3. In Act 37, the processor 11 reduces the value of the variable p by 1 to show that the drawing processing is terminated. The processor 11 terminates the drawing processing after the processing in Act 37. Then, the processor 11 terminates the thread that is executing the drawing processing.

If there is no compression core 15 in the idle state, the processor 11 determines No in Act 34 and proceeds to the processing in Act 38.

In Act 38, the processor 11 sets the value of the variable F2 from False to True to show that the compression monitor processing is being executed.

In Act 39, the processor 11 increases the value of the variable r by 1 to show that the compression wait quantity is increased.

In Act 40, the processor 11 adds the printing data converted in Act 31 to the compression wait queue. The processor 11 starts a new thread after the processing in Act 40. Then, the processor 11 proceeds to the processing in Act 37 in the existing thread. Further, the processor 11 starts the compression monitor processing shown in Act 41 in the new thread. The processing in Act 41 includes processing in Act 411 to Act 416.

In Act 411, the processor 11 acquires the compression core information in the same manner as Act 33.

In Act 412, the processor 11 refers to the compression core information acquired in Act 411 to determine whether or not there is the compression core 15 in the idle state. Alternatively, the processor 11 may determine whether or not the value of the variable q is greater than 0. If there is no compression core 15 in the idle state, the processor 11 determines No in Act 412 and returns to the processing in Act 411. On the other hand, if there is the compression core 15 in the idle state, the processor 11 determines Yes in Act 412 and proceeds to the processing in Act 413.

In Act 413, the processor 11 reduces the value of the variable q by 1 to show that the number of the compression cores 15 in the idle state decreases. Further, the processor 11 reduces the value of the variable r by 1 to show that the compression wait quantity decreases.

In Act 414, the processor 11 sends a compression request to the compression core 15 in the idle state to request the execution of the compression processing. The compression request includes the printing data added to the compression wait queue first in the printing data contained in the compression wait queue. Further, the processor 11 deletes the printing data from the compression wait queue.

In Act 415, the processor 11 determines whether or not there is the printing data waiting for the compression processing. In other words, the processor 11 determines whether or not there is the printing data in the compression wait queue. If there is the printing data waiting for the compression processing, the processor 11 determines Yes in Act 415 and returns to the processing in Act 411. On the other hand, if there is no printing data waiting for the compression processing, the processor 11 determines No in Act 415 and proceeds to the processing in Act 416.

In Act 416, the processor 11 sets the value of the variable F2 to False to show that the compression monitor processing is not being executed. The processor 11 terminates the compression monitor processing after the processing in Act 416. Then, the processor 11 terminates the thread which is executing the compression monitor processing.

If the compression monitor processing is being executed during the processing in Act 32, the processor 11 determines Yes in Act 32 and proceeds to the processing in Act 42.

In Act 42, the processor 11 adds the printing data converted in Act 31 to the compression wait queue. The processor 11 proceeds to the processing in Act 37 after processing in Act 42.

The processor 11 prints the compression data based on the print job, for example, after the conversion of the printing data contained in the print job to the compression data is terminated. The processor 11 controls the image forming section 16 to print the compression data stored in the auxiliary storage device 14.

The image forming apparatus 10 of the embodiment can efficiently use the processor 11. The reason is described below.

For example, the conventional image forming apparatus executes the RIP processing and the compression processing as shown in FIG. 5. FIG. 5 is a diagram illustrating an example of the processing timing of the conventional RIP processing and compression processing. In the example in FIG. 5, the processor executes the analysis processing in a thread 1 and the drawing processing in a thread 2. In the example in FIG. 5, the image forming apparatus includes one compression core.

The analysis section first executes the analysis processing on the first page. Then, if the analysis processing on the first page is completed, the analysis section requests the drawing processing section to start the drawing processing on the first page. The analysis section then continues the analysis processing on the second page.

On the other hand, the drawing processing section starts the drawing processing on the first page in response to the request to start the drawing processing on the first page. The drawing processing section then requests the compression core to compress the image data upon completion of the drawing processing on the first page.

In general, the drawing processing takes more time than the data analysis. Thus, while the drawing processing section is executing the drawing processing on the first page in the thread 2, the analysis section completes the analysis processing on the second page. Furthermore, the analysis section requests the drawing processing section to start the drawing processing on the second page. However, at this time, the drawing processing section is executing the drawing processing on the first page. For this reason, the drawing processing on the second page cannot be started immediately. Similarly, the drawing processing cannot be started immediately on the third page and subsequent pages, and waiting for processing occurs. Then, as shown in FIG. 5, the waiting time for the drawing processing becomes longer for latter pages. In the example in FIG. 5, the drawing processing takes longer time than the compression processing. Therefore, the compression core is in an unused state after executing the compression processing until the drawing processing section terminates the drawing processing on a next page.

Figure 6:
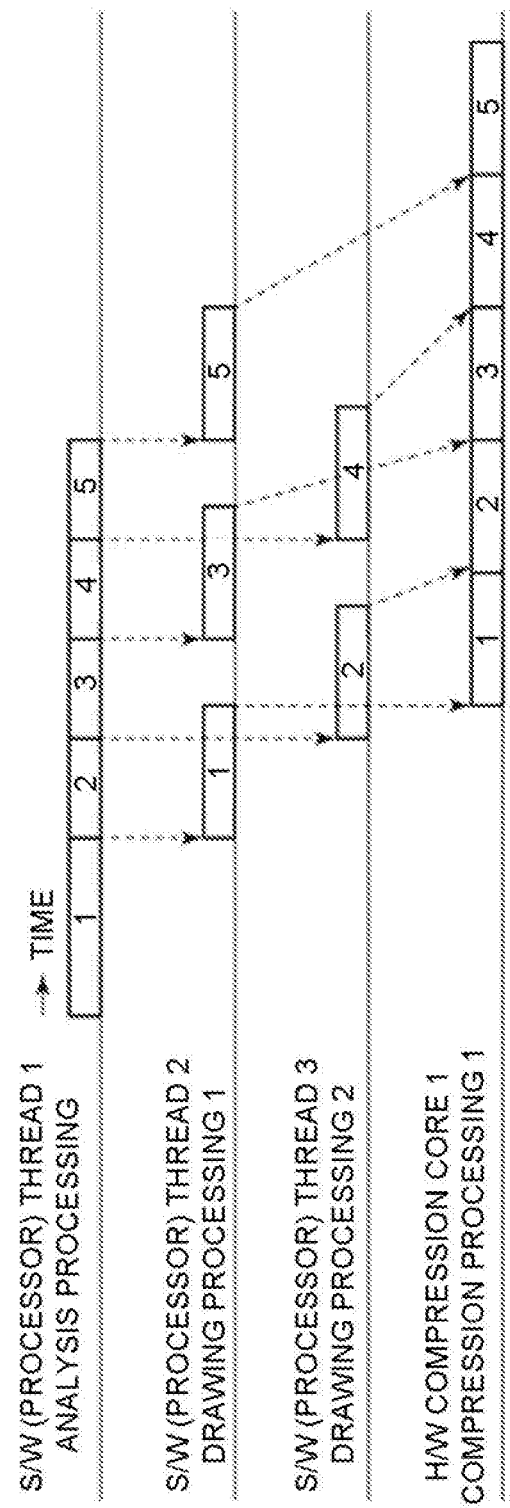
FIG. 6 is a diagram illustrating an example of processing timing of a RIP process and a compression process.

Next, an example of the parallel processing of a plurality of the drawing processing by multithread is shown in FIG. 6. FIG. 6 is a diagram illustrating an example of the processing timing of the RIP processing and the compression processing. In the example in FIG. 6, different from the example in FIG. 5, the image forming apparatus can execute the drawing processing in two threads, i.e. the thread 2 and a thread 3, respectively. In the example in FIG. 6, each time the analysis processing of one page is completed, the analysis section requests start of the drawing processing to the idle one of the thread 2 and the thread 3. As a result, by executing the drawing processing in each of a plurality of threads, the waiting for the drawing processing is less likely to occur compared to the example in FIG. 5. In the example in FIG. 6, the waiting for the drawing processing does not occur. The compression core is not in the state of not being used as in the example shown in FIG. 5 after executing the compression processing. However, in the example in FIG. 6, if the drawing processing section completes the drawing processing on the second page, the compression core does not yet complete the compression processing of the first page. For this reason, the compression core cannot execute the compression processing on the second page immediately even if the drawing processing section completes the drawing processing on the second page. Similarly, even after the third page, the compression core cannot execute the compression processing immediately after the drawing processing is completed. As shown in FIG. 6, the waiting time for the compression processing becomes longer for the latter pages.

In this way, even if the processor processes the RIP processing early, if waiting for the compression processing due to the fact that the compression core is not idle occurs, the entire processing speed is not improved. Besides, the usage ratio of the processor unnecessarily increases.

Figure 7:
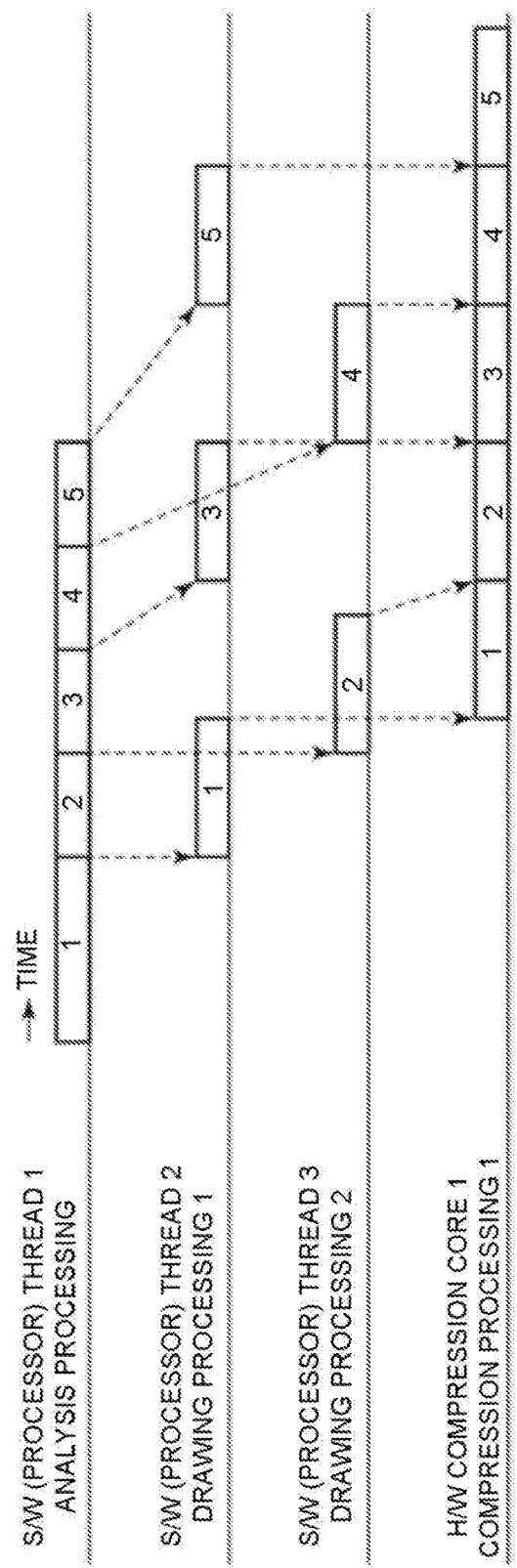
FIG. 7 is a diagram illustrating a first example of the processing timing of the RIP processing and the compression processing according to the embodiment.

FIG. 7 shows an example of the processing timing of the RIP processing and the compression processing in the image forming apparatus 10 according to the embodiment. In the example in FIG. 7, the image forming apparatus 10 includes one compression core 15 as in the example in FIG. 5 and FIG. 6. In the example in FIG. 7, the setting value k=1.

In the example in FIG. 7, when the analysis processing of the third page is completed, the compression processing of the first page is being executed by the compression core 15. Likewise, when the analysis process of the third page is completed, the drawing processing on the second page is being executed by the drawing processing section 113. Then, the compression core 15 starts the compression processing of the second page after completing the compression processing of the first page. For this reason, the execution of the drawing processing on the third page at this time point does not contribute to improving the entire processing speed, but only the usage ratio of the processor increases. Thus, the image forming apparatus 10 of the embodiment does not start the drawing processing on the third page until the compression processing of the first page is completed. By doing this, in the example in FIG. 7, the usage ratio of the processor is lower than that in the example in FIG. 6. However, the whole processing speed in the example in FIG. 7 is equivalent to that in FIG. 6. Therefore, the image forming apparatus 10 of the embodiment efficiently uses the processor 11.

Figure 8:
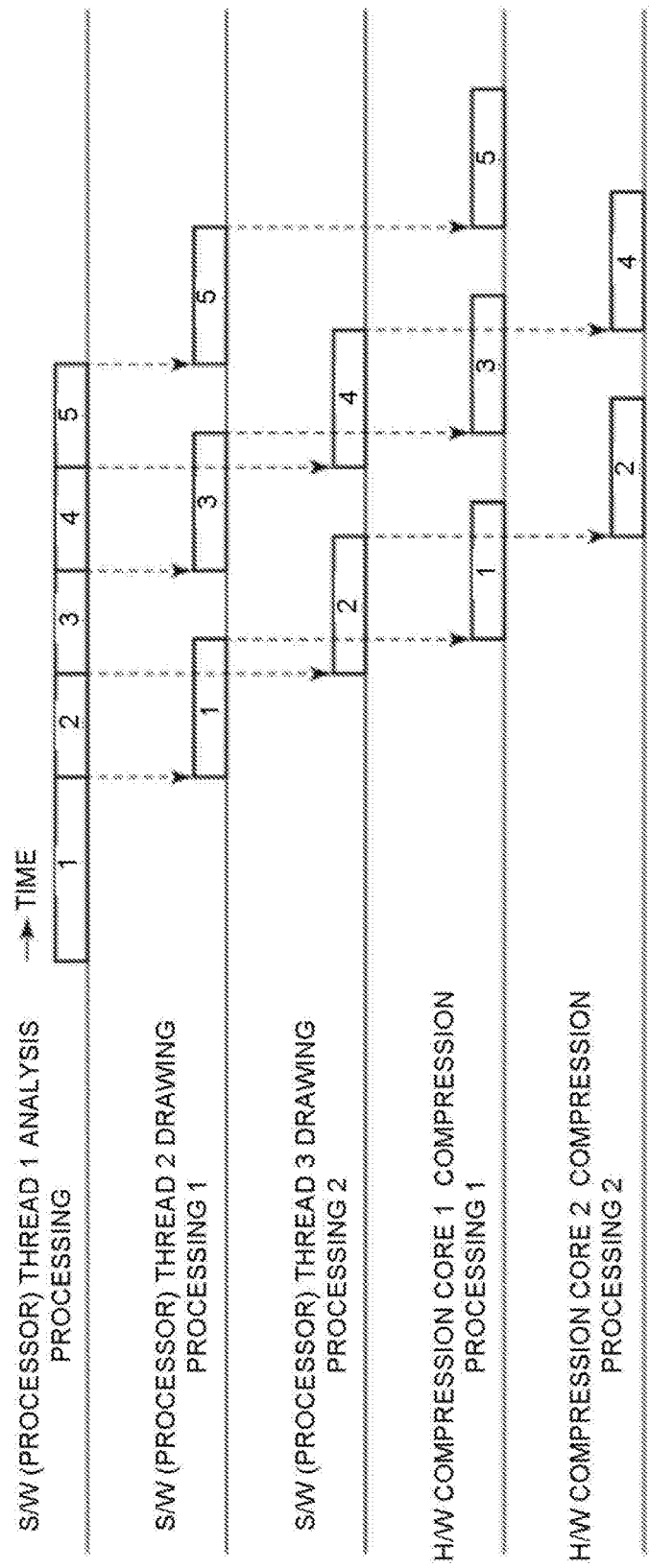
FIG. 8 is a diagram illustrating a second example of the processing timing of the RIP process and the compression process according to the embodiment.

Another example of the image forming apparatus 10 of the embodiment is shown in FIG. 8. FIG. 8 is a diagram illustrating an example of the processing timing of the RIP processing and the compression processing according to the embodiment. In the example in FIG. 8, different from the examples in FIG. 5 to FIG. 7, the image forming apparatus 10 has two compression cores 15. Also, in the example in FIG. 8, when the analysis processing of the third page is completed as in the example in FIG. 7, the compression processing of the first page is being executed by the first compression core 15. Likewise, when the analysis process of the third page is completed as in the example in FIG. 7, the drawing processing on the second page is being executed by the drawing processing section 113. However, in the example in FIG. 8, since there are two compression cores 15, without waiting for completion of the compression processing of the first page by the first compression core 15, the compression processing of the second page can be started by the second compression core 15. For this reason, in the example in FIG. 8, different from the example in FIG. 7, by starting the drawing processing on the third page, it is possible to contribute to the improvement in the whole processing speed. Therefore, in the example in FIG. 8, different from the example in FIG. 7, the drawing processing section 113 immediately starts the drawing processing on the third page. In the example in FIG. 8, since there is a plurality of the compression cores 15, the waiting for the compression processing does not occur. Therefore, the image forming apparatus 10 of the embodiment efficiently uses the processor 11.

As described above, according to the image forming apparatus 10 of the embodiment, start timing of the drawing processing changes according to the number of the compression cores 15. The image forming apparatus 10 of the embodiment can efficiently use the processor 11 according to the number of the compression cores 15.

The image forming apparatus 10 of the embodiment does not start a new drawing processing if the amount of data in preparation is greater than the number of the compression cores 15 in the idle state by k or more. In a case in which the amount of data in preparation is greater than the number of the compression cores 15 in the idle state by k or more, it is considered that starting the new drawing processing does not contribute to the improvement of the entire processing speed relative to the case in which the drawing processing is executed if the data in preparation is less than that. Therefore, by not starting the drawing processing in such a state, the image forming apparatus 10 of the embodiment can prevent the usage ratio of the processor 11 from unnecessarily increasing.

The above embodiment can also be modified as follows.

In the above embodiment, (the amount of data in preparation)=(the number of drawing threads p). However, (the amount of data in preparation)=(the drawing thread number p+the compression wait quantity r) may be used. By including the compression wait quantity in the amount of data in preparation, it is possible to prevent the compression wait quantity from increasing if time is taken on the compression processing. Since the number of drawing threads is reduced according to the compression wait quantity, it is possible to prevent an increase in the usage ratio of the processor 11 which does not contribute to the improvement in the entire processing speed.

The compression core 15 may notify the processor 11 that the compression data is generated after the processing in Act 53. Then, the compression core 15 may transmit the compression data to the auxiliary storage device under the control of the processor 11.

In the above embodiment, the processor 11 executes a program such that the analysis processing and the drawing monitor processing are executed in separate threads. However, instead of this program, the processor 11 may execute a program such that the analysis processing and the drawing monitor processing are executed in the same thread.

In the above embodiment, the processor 11 executes a program such that the drawing processing and the compression monitor processing are executed in separate threads. However, instead of this program, the processor 11 may execute a program that processes the drawing processing and the compression monitor processing with the same thread.

The processor 11 may execute the processing executed by multithreading in the above embodiment by multiprocessing.

Even if the printing object data is not in the PDL format, the present embodiment can be applied. The present embodiment can be applied to a process of converting the printing object data which is not in the PDL format to the printing data and the process of compressing the printing data.

The image forming apparatus 10 may execute the drawing processing on the data corresponding to one sheet of image recording medium including a plurality of pages in order to print a plurality of pages on one sheet of image recording medium. In this case, the data corresponding to one sheet of image recording medium is an example of one unit of printing.

The image forming apparatus 10 may execute the drawing processing on the data corresponding to one sheet of image recording medium obtained by dividing one page into plural parts and perform the printing of the plural parts onto plural sheets of the image recording medium. In this case, the data corresponding to one sheet of image recording medium is an example of one unit of printing.

The image forming apparatus of the present embodiment may not have the compression core 15. Then, instead of the compression core 15, the processor 11 may execute the parallel processing or the concurrent processing by executing a processing which is the same as the compression processing in a separate thread from the analysis processing and the drawing processing. In this case, by executing the same processing as the compression processing, the processor 11 operates as the compression section.

In the image forming apparatus of the present embodiment, the compression core may be integrated into the processor.

The image forming apparatus of the present embodiment may process a plurality of threads in parallel by hardware multithreading.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
a first processor core configured to allocate a plurality of threads to execute a drawing processing for converting printing object data divided into a plurality of units of printing to printing data;
a plurality of second processor cores designated to execute data compression on the printing data converted by the drawing processing; and
a storage device in which the compressed printing data are stored, wherein
the first processor core allocates a new thread to execute the drawing processing upon determining that the number of the second processor cores in an idle state is greater than the number of threads that are executing the drawing processing by a predetermined number.

2. The image processing apparatus according to claim 1, wherein
the plurality of the second processor cores executes the data compression on the printing data in parallel.

3. The image processing apparatus according to claim 1, wherein the unit of printing is a page of data and each of the threads executes the drawing processing on a page of the printing object data.

4. The image processing apparatus according to claim 3, wherein
the first processor core is configured to allocate a monitoring thread to track pages on which the threads are executing drawing processing, and
the monitoring thread is configured to determine whether the number of the second processor cores in an idle state is greater than the number of threads that are executing the drawing processing by the predetermined number, and to allocate the new thread if the condition is met.

5. The image processing apparatus according to claim 4, wherein the number of threads that are executing the drawing processing is tracked by a count, and different threads of the first processor core performs incrementing of the count and decrementing of the count.

6. The image processing apparatus according to claim 1, wherein
the first processor core is configured to allocate a monitoring thread to track availability of the second processor cores for executing the data compression, and
the monitoring thread is configured to allocate a new second processor core to execute the data compression upon determining that the new second processor core is idle.

7. The image processing apparatus according to claim 6, wherein the number of the second processor cores that are in the idle state is tracked by a count, and different threads of the first processor core performs incrementing of the count and decrementing of the count.

8. An image forming apparatus, comprising:
an image forming unit;
a first processor core configured to allocate a plurality of threads to execute a drawing processing for converting printing object data divided into a plurality of units of printing to printing data that is in a printable form by the image forming unit;
a plurality of second processor cores designated to execute data compression on the printing data converted by the drawing processing; and
a storage device in which the compressed printing data are stored, wherein
the first processor core allocates a new thread to execute the drawing processing upon determining that the number of the second processor cores in an idle state is greater than the number of threads that are executing the drawing processing by a predetermined number.

9. The image forming apparatus according to claim 8, wherein
the plurality of the second processor cores executes the data compression on the printing data in parallel.

10. The image forming apparatus according to claim 8, wherein the unit of printing is a page of data and each of the threads executes the drawing processing on a page of the printing object data.

11. The image forming apparatus according to claim 10, wherein
the first processor core is configured to allocate a monitoring thread to track pages on which the threads are executing drawing processing, and
the monitoring thread is configured to determine whether the number of the second processor cores in an idle state is greater than the number of threads that are executing the drawing processing by the predetermined number, and to allocate the new thread if the condition is met.

12. The image forming apparatus according to claim 11, wherein the number of threads that are executing the drawing processing is tracked by a count, and different threads of the first processor core performs incrementing of the count and decrementing of the count.

13. The image forming apparatus according to claim 8, wherein
the first processor core is configured to allocate a monitoring thread to track availability of the second processor cores for executing the data compression, and
the monitoring thread is configured to allocate a new second processor core to execute the data compression upon determining that the new second processor core is idle.

14. The image forming apparatus according to claim 13, wherein the number of the second processor cores that are in the idle state is tracked by a count, and different threads of the first processor core performs incrementing of the count and decrementing of the count.

15. A method of processing data for printing and storage, comprising:
    allocating a plurality of threads to execute a drawing processing for converting printing object data divided into a plurality of units of printing to printing data;
    executing data compression on the printing data converted by the drawing processing in one or more compression processor cores; and
    storing the compressed printing data in a storage device, wherein
    a new thread is allocated to execute the drawing processing upon determining that the number of the compression processor cores in an idle state is greater than the number of threads that are executing the drawing processing by a predetermined number.

16. The method according to claim 15, wherein the plurality of the compression processor cores executes the data compression on the printing data in parallel.

17. The method according to claim 15, wherein the unit of printing is a page of data and each of the threads executes the drawing processing on a page of the printing object data.

18. The method according to claim 17, further comprising:
    allocating a monitoring thread to track pages on which the threads are executing drawing processing, wherein
    the monitoring thread determines whether the number of the second processor cores in an idle state is greater than the number of threads that are executing the drawing processing by the predetermined number, and allocates the new thread if the condition is met.

19. The method according to claim 15, further comprising:
    allocating a monitoring thread to track availability of the compression processor cores for executing the data compression, wherein
    the monitoring thread allocates a new compression processor core to execute the data compression upon determining that the new compression processor core is idle.

20. The method according to claim 15, wherein the number of threads that are executing the drawing processing is tracked by a first count, and the number of the second processor cores that are in the idle state is tracked by a second count, and different threads of the first processor core performs incrementing and decrementing of the first count and different threads of the first processor core performs incrementing and decrementing of the second count.

* * * * *